United States Patent
Philippe et al.

(10) Patent No.: US 10,469,872 B2
(45) Date of Patent: Nov. 5, 2019

(54) VIDEO ENCODING AND DECODING DEVICE AND METHOD INCLUDING A TEXTURE BLOCK PREDICTION WITH A GROUP OF PIXEL BLOCKS EACH REPRESENTING A PREDETERMINED TEXTURE

(71) Applicant: Orange, Paris (FR)

(72) Inventors: Pierrick Philippe, Melesse (FR); Adria Arrufat, Rennes (FR)

(73) Assignee: ORANGE, Paris (FR)

( * ) Notice: Subject to any disclaimer, the term of this patent is extended or adjusted under 35 U.S.C. 154(b) by 20 days.

(21) Appl. No.: 15/503,603

(22) PCT Filed: Aug. 11, 2015

(86) PCT No.: PCT/FR2015/052194
§ 371 (c)(1),
(2) Date: Feb. 13, 2017

(87) PCT Pub. No.: WO2016/024067
PCT Pub. Date: Feb. 18, 2016

(65) Prior Publication Data
US 2017/0230688 A1 Aug. 10, 2017

(30) Foreign Application Priority Data
Aug. 12, 2014 (FR) .................................... 14 57768

(51) Int. Cl.
*H04N 19/61* (2014.01)
*H04N 19/597* (2014.01)
(Continued)

(52) U.S. Cl.
CPC ......... *H04N 19/597* (2014.11); *H04N 19/119* (2014.11); *H04N 19/12* (2014.11);
(Continued)

(58) Field of Classification Search
CPC .. H04N 19/119; H04N 19/154; H04N 19/176; H04N 19/182; H04N 19/597
(Continued)

(56) References Cited

U.S. PATENT DOCUMENTS 6,763,070 B1 7/2004 Lee
2009/0175332 A1* 7/2009 Karczewicz ......... H04N 19/176
375/240.03
(Continued)

OTHER PUBLICATIONS

Li et al. "Joint Group and residual sparse coding for image compressive sensing" State Key Lab of Integrated Services Networks, Xidian University, Jan. 24, 2019 (Year: 2019).*
(Continued)

*Primary Examiner* — James T Boylan
(74) *Attorney, Agent, or Firm* — David D. Brush; Westman, Champlin & Koehler, P.A.

(57) ABSTRACT

A method is provided for encoding at least one image cut into blocks. The method includes, for a current block having K pixels to be encoded, wherein K>1, acts including: predicting the current block using at least one predictive block having K pixels; then determining a residual block having K pixels and representing the difference between the predictive block and the common block. A set of Mi data is determined from a pixel block group containing a number Mi of blocks having K pixels and each representing a predetermined texture, wherein 1<Mi<K, by calculating the pixel-by-pixel product of the residual block determined by each of the Mi blocks of K pixels representing a predetermined texture, and encoding the Mi data from the determined data set.

14 Claims, 7 Drawing Sheets

(51) Int. Cl.

| | |
|---|---|
| *H04N 19/147* | (2014.01) |
| *H04N 19/593* | (2014.01) |
| *H04N 19/12* | (2014.01) |
| *H04N 19/132* | (2014.01) |
| *H04N 19/119* | (2014.01) |
| *H04N 19/154* | (2014.01) |
| *H04N 19/97* | (2014.01) |
| *H04N 19/176* | (2014.01) |
| *H04N 19/182* | (2014.01) |

(52) U.S. Cl.
CPC ......... *H04N 19/132* (2014.11); *H04N 19/147* (2014.11); *H04N 19/154* (2014.11); *H04N 19/593* (2014.11); *H04N 19/176* (2014.11); *H04N 19/182* (2014.11); *H04N 19/97* (2014.11)

(58) Field of Classification Search
USPC .......................... 375/240.03, 240.12, 240.18
See application file for complete search history.

(56) References Cited

U.S. PATENT DOCUMENTS

| | | | | |
|---|---|---|---|---|
| 2011/0274164 | A1* | 11/2011 | Sole ........................ | H04N 19/70 375/240.12 |
| 2013/0089151 | A1* | 4/2013 | Do ........................ | H04N 19/176 375/240.18 |
| 2015/0071344 | A1* | 3/2015 | Tourapis ................ | H04N 19/15 375/240.03 |
| 2015/0373330 | A1* | 12/2015 | Jeong ..................... | H04N 19/61 375/240.03 |

OTHER PUBLICATIONS

Vaswani LS-CS-Residual (LS-CS): Compressive Sensing on Least Squares Residual, IEEE, vol. 58, No. 8, Aug. 2010 (Year: 2010).*

Mun et al. "Residual Reconstruction for Block-Based Compressed Sensing of Video", Mississippi State University, IEEE, 2011 (Year: 2011).*

Babacan et al. "Reference-Guided Sparsifying Transform Design for Compressive Sensing MRI", IEEE, 2011 (Year: 2011).*

Ma et al. "Group-Based Truncated L1-2 Model for Image Inpainting", IEEE, Sep. 2017 (Year: 2017).*

Shu et al. "Non-Local Compressive Sampling Recovery", University of Illinois at Urbana-Champaign, 2014 (Year: 2014).*

International Search Report dated Oct. 22, 2015 for corresponding International Application No. PCT/FR2015/052194, filed Aug. 11, 2015.

Yifu Zhang et al., "A novel Image/Video Coding Method Based on Compressed Sensing Theory", Acoustics, Speech and Signal Processing, 2008. ICASSP 2008. IEEE International Conference ON, IEEE, Piscataway, NJ, USA, Mar. 31, 2008, pp. 1361-1364, XP031250813.

R.J. Clarke, "Transform Coding of Images: Chapter 3 Orthogonal Transforms for Image Coding, IN: Transform Coding of Images: Chapter 3, Orthogonal Transforms for Image Coding", Jan. 1, 1990, Academic Press, Inc, XP055181713.

Written Opinion of the International Searching Authority dated Oct. 22, 2015, for corresponding International Application No. PCT/FR2015/052194, filed Aug. 11, 2015.

ISO/IEC/23008-2 ITU-T Recommendation H.265 High Efficiency Video Coding (HEVC); "Series H: Audiovisual and Multimedia Systems Infrastructure of audiovisual services—Coding of moving video" Oct. 2014.

Zhu et al. "A reversibility-gain model for integer Karhunen-Loeve transform design in video coding." Frontiers of Information Technology & Electronic Engineering, 16(10), pp. 883-891. 2015.

Lee et al. "DCT Block Conversion for H.264/AVC Video Transcoding." Dep. of Computer Engineering, Pusan National Univ., Jangjeon-dong, Geumjeong-gu, Busan, 609-735, Korea,Cunha J.C., Medeiros P.D. (eds) Euro-Par 2005 Parallel Processing. Euro-Par 2005. Lecture Notes in Computer Science, vol. 3648. Springer, Berlin, Heidelberg (2005).

Pei et al. "The Integer Transforms Analogous to Discrete Trigonometric Transforms." IEEE Transactions on Signal Processing, vol. 48, No. 12, pp. 3345-3364. Dec. 2000.

Erturk. "Warped Discrete Cosine Transform-Based Low Bit-Rate Block Coding Using Image Downsampling." EURASIPJournal on Advances in Signal Processing, Hindawi Publishing Corporation, Article ID 43948. 2007.

* cited by examiner

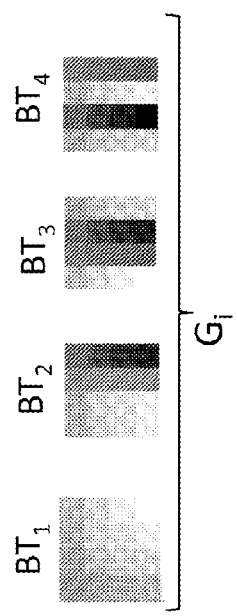
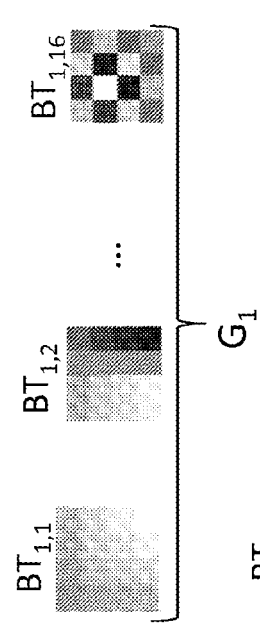
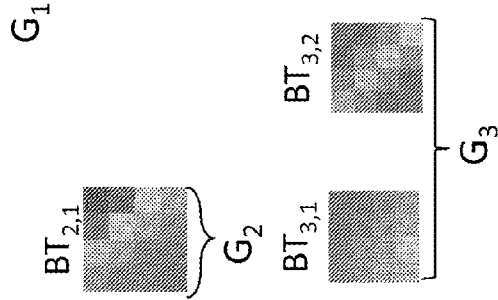
FIG.3A
FIG.3B

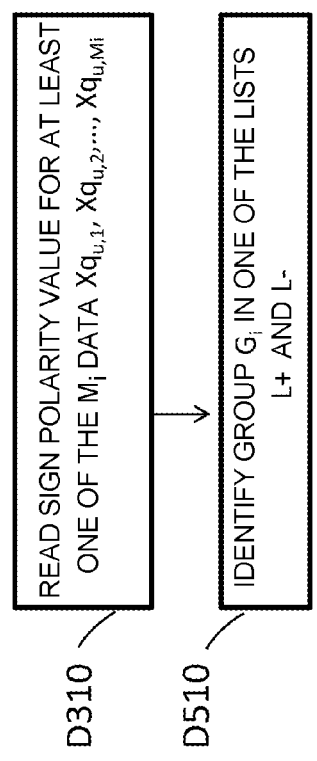

VIDEO ENCODING AND DECODING DEVICE AND METHOD INCLUDING A TEXTURE BLOCK PREDICTION WITH A GROUP OF PIXEL BLOCKS EACH REPRESENTING A PREDETERMINED TEXTURE

CROSS-REFERENCE TO RELATED APPLICATIONS

This Application is a Section 371 National Stage Application of International Application No. PCT/FR2015/052194, filed Aug. 11, 2015 which is incorporated by reference in its entirety and published as WO 2016/024067 on Feb. 18, 2016, not in English.

FIELD OF THE INVENTION

The present invention relates in a general manner to the field of image processing, and more precisely to the coding and decoding of digital images and of sequences of digital images.

The coding/decoding of digital images applies particularly to images from at least one video sequence having:
  images from one and the same camera and temporally successive (2D-type coding/decoding),
  images from different cameras oriented in different views (3D-type coding/decoding),
  components of corresponding texture and depth (3D-type coding/decoding),
  etc.

The present invention similarly applies to 2D- or 3D-type image coding/decoding.

The invention may particularly, but not exclusively, apply to video coding implemented in current AVC and HEVC video coders and their extensions (MVC, 3D-AVC, MV-HEVC, 3D-HEVC, etc.), and to the corresponding decoding.

PRIOR ART

Current video coders (MPEG, H.264, HEVC, etc.) use a block representation of the video sequence. The images are cut into blocks, which are able to be cut again recursively. Each block is then coded by intra-image or inter-image prediction. Thus, some images are coded by spatial prediction (intra-prediction), and other images are also coded by temporal prediction (inter-prediction) in relation to one or more coded-decoded reference images, using motion compensation known to a person skilled in the art.

For each block, a residue block, also called prediction residual, corresponding to the original block diminished by a prediction, is coded. The residue blocks are transformed using a mathematical transformation operation, and are then quantized using a mathematical quantization operation, for example of scalar type. Coefficients are obtained at the end of the quantization step. They are then scanned in an order of reading that is dependent on the coding mode that has been chosen. In the HEVC standard, for example, the order of reading is dependent on the prediction performed and can be carried out in the "horizontal", "vertical" or "diagonal" order.

At the end of the aforementioned scanning, a one-dimensional list of coefficients is obtained. The coefficients of this list are then coded in the form of bits by an entropy coding, the aim of which is to code the coefficients without losses.

The bits obtained after entropy coding are written in a data stream or signal that is intended to be transmitted to the decoder.

In a manner that is known per se, such a signal comprises:
  the quantized coefficients contained in the aforementioned list,
  pieces of information representing the coding mode used, in particular:
    the prediction mode (intra-prediction, inter-prediction, default prediction implementing a prediction for which no information is transmitted to the decoder ("skip"));
    pieces of information specifying the type of prediction (orientation, reference image, etc.);
    the type of cutting of the block;
    the type of transform, for example DCT 4×4, DCT 8×8, etc.
    motion information if necessary;
    etc.

Once the stream has been received by the decoder, decoding is performed image by image, and for each image, block by block. For each block, the corresponding elements of the stream are read. The inverse quantization and the inverse transformation of the coefficients of the blocks are performed in order to produce the decoded prediction residual. The prediction for the block is then calculated and the block is reconstructed by adding the prediction to the decoded prediction residual.

The conventional coding/decoding technique that has just been described certainly allows improvements in coding performance levels. In the video context, it particularly allows:
  an improvement in the quality of the images for a given bit rate for the network used for transmitting the images,
  a reduction in the rate of transmission of the images for a previously fixed image quality criterion.

However, such coding performance levels are not currently optimized and have authority to yet be improved, particularly for the point of view of minimization of the rate/distortion cost or even of the choice of the best effectiveness/complexity compromise, which are criteria well known to a person skilled in the art.

In particular, such optimization could concern the aforementioned mathematical transformation operation. This is conventionally a linear transformation that, when applied to a residue block containing a determined number of K pixels ($K \geq 1$), allows a set of K real coefficients to be obtained.

In the field of video coding, discrete cosine transforms, DCT, or discrete sine transforms, DST, are generally privileged, particularly for the following reasons:
  these are block transforms and it is thus simple to manipulate the blocks independently of one another,
  they are effective for compacting the piece of information in the frequency domain, where the rate reduction operation proceeds.

However, with such transforms, the algorithmic complexity of the video coder increases in a marked fashion particularly if the image to be coded is cut into blocks of large size, for example into blocks of size 16×16 or 32×32.

By way of example, for a block of 16×16 pixels that is to be coded, a number $K=256$ pixels is intended to undergo a transformation of the aforementioned type.

Conventionally, such a transformation involves applying a first transformation operation A to a residue block x having K pixels organized in the form of a 16×16 matrix, where A is a data matrix having an identical size to that of the residue block x, that is to say 16×16 in the presented example. At the end of this first transformation, a first transformed block A·x is obtained.

A transposition operation t is then applied to the transformed block A·x. At the end of this transposition, a transposed block $(A·x)^t$ is obtained.

Finally, a second transformation operation A is applied to the transposed block $(A·x)^t$. At the end of this second transformation, a second transformed block X having K=16×16 pixels is obtained, such that:

$$X = A \cdot (Ax)^t$$

If only a residue block x presenting itself in the form of a column matrix having 16 pixels is considered, then the algorithms used for the coder already perform numerous operations, such as 2×81 additions and 2×33 multiplications, in order to obtain a transformed block X in the form of a column matrix having 16 pixels. Thus, it clearly appears that in the case of the residue block of 16×16 pixels in the presented example, the algorithms used for the coder must perform the number of aforementioned operations 16 times, or 16×2×81 additions and 16×2×33 multiplications, which amounts to performing 2592 additions and 1056 multiplications in total in order to obtain the K=256 coefficients transformed for a block of size 16×16.

The following table summarizes the number of operations to be performed according to the size of the current pixel block to be coded that is under consideration, when a transformation of DCT type is applied:

| DCT 2D | Additions | Multiplications |
| --- | --- | --- |
| 4 × 4 | 72 | 40 |
| 8 × 8 | 464 | 208 |
| 16 × 16 | 2592 | 1056 |
| 32 × 32 | 13376 | 5184 |

It can be concluded from the table above that, particularly for blocks of large size, 16×16 and 32×32, the number of operations becomes particularly large.

Further, when the transform is applied to blocks of size 16×16 or 32×32, this is followed by a large number of coefficients, 256 or 1024 respectively, being obtained that are subsequently quantized, and then coded by entropy coding.

In the HEVC standard, for example, entropy coding (for example of arithmetic coding or Huffman coding type) is performed in the following manner:

a piece of information is subjected to entropy coding in order to indicate the location of the last nonzero coefficient of the set of quantized coefficients, for each coefficient situated before the last nonzero coefficient, a piece of information is subjected to entropy coding in order to indicate whether or not the coefficient is zero, for each nonzero coefficient indicated above, a piece of information is subjected to entropy coding in order to indicate whether or not the coefficient is equal to one, for each nonzero and non-one coefficient situated before the last nonzero coefficient, a piece of amplitude information (absolute value of the coefficient diminished by two) is subjected to entropy coding, for each nonzero coefficient, the sign assigned thereto is coded by a "0" (for the + sign) or a "1" (for the − sign).

Thus, the greater the number of transformed coefficients, the more complex the subsequent quantization and entropy coding operations are to perform.

It is also worth noting that the very large number of coefficients obtained following such transforms is very costly to signal to the decoder and brings about a large reduction in the transmission rate gain for the coded data between the coder and the decoder.

As far as the decoding of a current block is concerned, for example a current block of 16×16 pixels to be decoded, the 256 coefficients obtained at the end of the aforementioned entropy coding undergo a similar transformation to that performed in the coding.

Consequently, for the decoder, the complexity of the algorithms necessary for transforming the coefficients obtained at the end of the entropy coding is the same as for the algorithms used in the coder to perform the transformation of the current residual block.

SUBJECT AND SUMMARY OF THE INVENTION

One of the aims of the invention is to overcome disadvantages of the aforementioned prior art.

To this end, one subject of the present invention concerns a method for coding at least one image cut into blocks, comprising, for a current block having K pixels to be coded, where K≥1, the steps involving:

predicting the current block using at least one predictor block having K pixels, determining a residue block having K pixels and representing the difference between the predictor block and the current block.

The coding method according to the invention is remarkable in that it comprises the steps involving:

taking a group of pixel blocks containing a number $M_i$ of blocks having K pixels and each representing a predetermined texture, where i≥1 and 1≤$M_i$<K, as a basis for determining a set of $M_i$ data by calculating the pixel-by-pixel product of the residue block determined by each of the $M_i$ blocks of K pixels representing a predetermined texture, coding the $M_i$ data of the determined data set.

Since the determined data set systematically contains a number $M_i$ of data lower than the number K of pixels of the current block, such a provision advantageously allows less data to be coded than in the prior art, which potentially orders K data to be coded.

According to a particular embodiment, the group of pixel blocks containing a number $M_i$ of blocks having K pixels and each representing a predetermined texture belongs to L groups of pixel blocks respectively containing a number $M_1$, $M_2$, ..., $M_i$, ..., $M_L$ of blocks having K pixels and each representing a predetermined texture, where 1≤i≤L, the coding method comprising, prior to the step of coding the $M_i$ data of the determined data set, the steps involving:

taking the L groups of pixel blocks respectively containing a number $M_1$, $M_2$, ..., $M_i$, ..., $M_L$ of blocks having K pixels and each representing a predetermined texture, as a basis for respectively determining L sets of $M_1$, $M_2$, ..., $M_i$, ..., $M_L$ data by calculating the pixel-by-pixel product of the residue block determined by each of the $M_1$, $M_2$, ..., $M_i$, ..., $M_L$ blocks of K pixels representing a predetermined texture, selecting the set of $M_i$ data from among the L sets of $M_1$, $M_2$, ..., $M_i$, ..., $M_L$ data, according to a predetermined coding performance criterion.

When the selected data set contains a number of data lower than the number K of pixels of the current block, such a provision allows fewer data to be coded than in the prior art, which systematically orders K data to be coded. Moreover, on account of a larger number of texture block groups being available for coding, it is thus possible to test multiple possibilities for coding a current block, and, in the coding context, to meet a compromise between a small number of data to be coded that can be obtained and a high restoration quality for the reconstructed image.

According to a particular embodiment, the set of $M_i$ data determined or even selected according to a predetermined coding performance criterion contains a single datum.

Such a provision advantageously allows optimization of the reduction in the coding cost and avoidance of indication of the position of the coded datum associated with the determined or selected set of $M_i$ data, since $M_i=1$.

According to another particular embodiment, the predetermined coding performance criterion is the minimization of the rate-distortion cost of the current block to be coded.

The choice of such a criterion optimizes the selection of the set of $M_i$ data from among the L available data sets.

According to another particular embodiment, the coding method further comprises a step of preparation of a data signal containing:
  a piece of identification information for the predictor block,
  the coded data from the set of $M_i$ data that has been obtained by calculating the pixel-by-pixel product of the residue block determined by each of the $M_i$ blocks of K pixels representing a predetermined texture,
  a piece of identification information for the group containing the blocks of K pixels from which the selected set of $M_i$ data has been determined.

Such a provision advantageously allows reduction of the cost of signaling if the selected data set contains a number of data that is smaller than the number K of pixels of the current block.

The various aforementioned embodiments or implementation features can be added independently or in combination with one another to the steps of the coding method as defined above.

The invention also concerns a device for coding at least one image cut into blocks, comprising, for a current block having K pixels to be coded, where $K \geq 1$, a prediction module for predicting the current block using at least one predictor block having K pixels and for determining a residue block having K pixels and representing the difference between the predictor block and the current block.

Such a coding device is remarkable in that it comprises:
  a calculation module for taking a group of pixel blocks containing a number $M_i$ of blocks having K pixels and each representing a predetermined texture, where $i \geq 1$ and $1 \leq M_i < K$, as a basis for determining a set of $M_i$ data by calculating a pixel-by-pixel product of the residue block determined by each of the $M_i$ blocks of K pixels representing a predetermined texture,
  a coding module for coding the $M_i$ data from the determined data set.

Such a coding device is particularly capable of implementing the aforementioned coding method.

The invention also concerns a method for decoding a data signal representing at least one image cut into blocks, comprising, for a current block having K pixels to be reconstructed, where $K \geq 1$, a step involving determining at least one predictor block for the current block to be reconstructed, said predictor block containing K pixels.

Such a decoding method is remarkable in that it comprises the steps involving:
  reading, from data signal, a set of $M_i < K$ data,
  identifying a group of pixel blocks containing a given number $M_i$ of blocks having K pixels and each representing a predetermined texture, where $i \geq 1$ and $1 \leq M_i < K$,
  determining $M_i$ blocks having K pixels by calculating the product of each of the $M_i$ blocks of K pixels of the group identified by, respectively, each of the $M_i$ data from the read set of $M_i$ data,
  calculating the sum of the $M_i$ determined blocks of K pixels,
  determining a decoded current residue block having K pixels from the calculated sum,
  reconstructing the current block from the determined decoded current residue block and the determined predictor block.

Such a provision advantageously allows, if the read data set contains a number of data that is smaller than the number K of pixels of the current block to be decoded, decoding of a smaller number of data than in the prior art, which systematically orders the decoding of K data. This results in less complex and faster decoding.

According to a particular embodiment, the read set of $M_i$ data contains a single datum.

According to a particular embodiment, the group of pixel blocks containing a given number $M_i$ of blocks having K pixels and each representing a predetermined texture belongs to L groups of pixel blocks respectively containing a number $M_1, M_2, \ldots, M_i, \ldots, M_L$ of blocks having K pixels and each representing a predetermined texture, where $1 \leq i \leq L$.

According to another particular embodiment:
  a group from among the L groups of pixel blocks contains K blocks having a predetermined texture,
  the L−1 remaining groups of pixel blocks each contain a unique block having a predetermined texture.

According to yet another particular embodiment, the method further entails the steps involving:
  reading from the data signal the value of the polarity of the sign of at least one datum from the read set of $M_i$ data,
  taking the read value of the polarity of the sign and taking the piece of pixel block group identification information read from the signal as a basis for identifying the block of K pixels representing a predetermined texture either in a first set that contains a portion of the L groups of blocks of K pixels each representing a predetermined texture or in a second set that contains the other portion of the L groups of blocks of K pixels each representing a predetermined texture.

Such a provision allows significant reduction of the bit rate gain, owing to the fact that it is possible to reduce the cost of signaling the L groups of pixel blocks respectively containing a number $M_1, M_2, \ldots, M_i, \ldots, M_L$ of blocks having K pixels and each representing a predetermined texture. By way of example, if $M_i=1$, the positive or negative sign of the unique datum read allows identification of 2L groups of blocks having a predetermined texture, which are coded on log 2(L) bits, for example, rather than on log 2(2L) bits.

The various aforementioned embodiments or implementation features can be added independently or in combination with one another to the steps of the decoding method as defined above.

Correlatively, the invention also concerns a device for decoding a data signal representing at least one image cut into blocks, comprising a determining module for determining, for a current block of K pixels to be reconstructed, where K≥1, at least one predictor block for the current block to be reconstructed, said predictor block containing K pixels.

Such a decoding device is remarkable in that it comprises:
a reading module for reading, from the data signal, a set of $M_i$<K data,
a processing module for identifying a group of pixel blocks containing a given number $M_i$ of blocks having K pixels and each representing a predetermined texture, where i≥1 and 1≤$M_i$<K,
a calculation module for:
determining $M_i$ blocks having K pixels by calculating the product of each of the $M_i$ blocks of K pixels for the group identified by, respectively, each of the $M_i$ data from the read set of $M_i$ data,
calculating the sum of the $M_i$ determined blocks of K pixels,
determining a decoded current residue block having K pixels from the calculated sum,
a decoding module for reconstructing the current block from the determined decoded current residue block and the determined predictor block.

Such a decoding device is particularly capable of implementing the aforementioned decoding method.

The invention also concerns a computer program having instructions for implementing one of the coding and decoding methods according to the invention when it is executed on a computer.

This program can use any programming language and be in the form of source code, object code, or intermediate code between source code and object code, such as in a partial compiled form, or in any other desirable form.

The invention is also directed at a computer-readable recording medium on which is recorded a computer program, this program having instructions adapted to implement one of the coding or decoding methods according to the invention, as are described above.

The invention is also directed at a computer-readable recording medium on which is recorded a computer program, this program having instructions adapted to implementing the coding or decoding method according to the invention, as are described above.

The recording medium may be any entity or device capable of storing the program. By way of example, the medium may have a storage means, such as ROM, for example a CD-ROM or a microelectronic circuit ROMi or even a magnetic recording means, for example a USB key or a hard disk.

On the other hand, the recording medium may be a transmissible medium such as an electrical or optical signal, which can be conveyed via an electrical or optical cable, by radio or by other means. The program according to the invention can particularly be downloaded on an Internet-type network.

Alternatively, the recording medium may be an integrated circuit in which the program is incorporated, the circuit being adapted to execute or to be used in the execution of the aforementioned coding or decoding method.

BRIEF DESCRIPTION OF THE DRAWINGS

Other features and advantages will emerge on reading a preferred embodiment described referring to the figures, in which:

FIG. 7 represents additional steps of the decoding method from FIG. 6.

DETAILED DESCRIPTION OF THE CODING PART

A first embodiment of the invention will now be described, in which the coding method according to the invention is used to code an image or a sequence of images according to a binary stream close to that obtained by coding conforming to the HEVC standard, for example.

In this embodiment, the coding method according to the invention is implemented in a software or hardware manner, for example, by modifications to a coder initially conforming to the HEVC standard. The coding method according to the invention is represented in the form of an algorithm having steps C1 to C11 as represented in FIG. 1.

Figure 2:
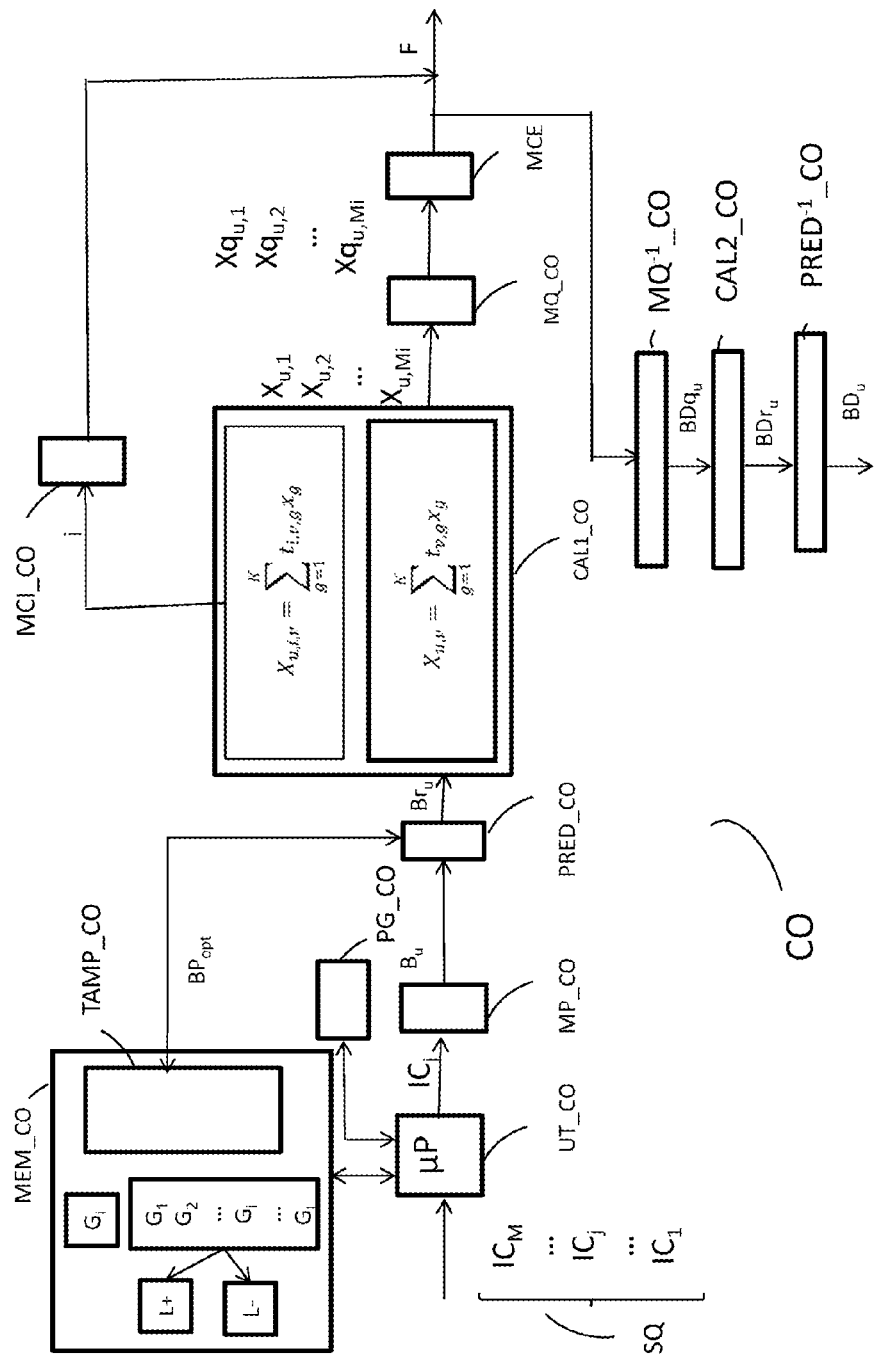
FIG. 2 represents an embodiment of a coding device according to the invention, FIGS. 3A and 3B respectively represent a group of blocks having a predetermined texture and multiple groups of blocks having a predetermined texture that are intended to be used in the coding method according to the invention.

According to the embodiment of the invention, the coding method according to the invention is implemented in a coding device CO represented in FIG. 2.

As illustrated in FIG. 2, such a coding device comprises a memory MEM_CO comprising a buffer memory TAMP_CO, a processing unit UT_CO, for example equipped with a microprocessor µP and controlled by a computer program PG_CO that implements the coding method according to the invention. On initialization, the code instructions of the computer program PG_CO are loaded into a RAM memory (not shown), for example, before being executed by the processor of the processing unit UT_CO.

Figure 1:
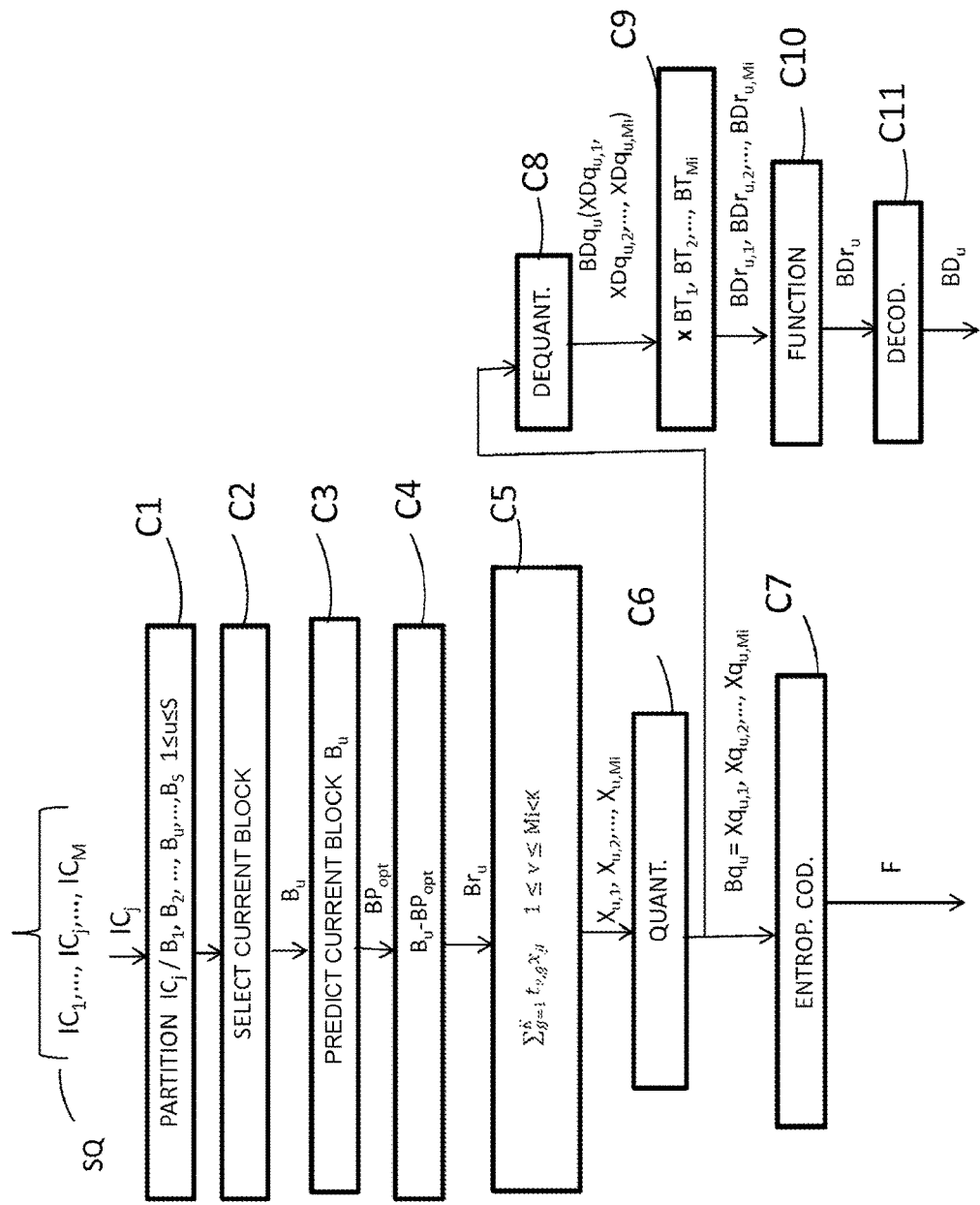
FIG. 1 represents the steps of the coding method according to an embodiment of the invention.

The coding method represented in FIG. 1 is applied to any current image of a sequence SQ of images to be coded.

During a step C1 represented in FIG. 1, in a manner known per se, a current image $IC_j$ belonging to the sequence SQ of images $IC_1, \ldots, IC_j, \ldots, IC_M$ (1≤j≤M) is partitioned into a plurality of blocks $B_1, B_2, \ldots, B_u, \ldots, B_S$ (1≤u≤S). Such a partitioning step is implemented by a partitioning software module MP_CO represented in FIG. 2, which module is controlled by the microprocessor µP of the processing unit UT_CO. It is worth noting that within the context of the invention, the term "block" means coding unit. This latter terminology is particularly used in the HEVC standard "ISO/IEC/23008-2 ITU-T Recommendation H.265 High Efficiency Video Coding (HEVC)".

In particular, such a coding unit groups together sets of pixels of rectangular or square shape, also called blocks, macroblocks, or sets of pixels having other geometric shapes.

Said blocks $B_1, B_2, \ldots, B_u, \ldots, B_S$ are intended to be coded according to a predetermined order of scanning, which is of raster scan type, for example. This means that the blocks are coded one after the other, from left to right.

Other types of scanning are of course possible. Thus, it is possible to cut the image $IC_j$ into multiple subimages called slices and to independently apply a cut of this type to each subimage. It is also possible to code not a succession of rows, as explained above, but a succession of columns. It is also possible to scan the rows or columns in one direction or in the other.

According to one example, the blocks $B_1, B_2, \ldots, B_u, \ldots, B_S$ have a square shape and contain all K pixels, where K≥1. Depending on the size of the image, which is not necessarily a multiple of the size of the blocks, the last blocks on the left and the last blocks at the bottom may not be square. In an alternative embodiment, the blocks may be of rectangular size and/or not aligned with one another, for example.

Each block may furthermore itself be divided into sub-blocks that are themselves subdivisible.

During a step C2 represented in FIG. 1, the coder CO selects as the current block a first block to be coded $B_u$ from the image $IC_j$, such as the first block $B_1$, for example.

During a step C3 represented in FIG. 1, the current block $B_u$ is predicted using known intra-prediction and/or inter-prediction techniques. To this end, the block $B_u$ is predicted in relation to at least one predictor block in accordance with a prediction mode selected from among a plurality of predetermined prediction modes. By way of example, there are thirty-five predetermined prediction modes, each of intra type.

Such a predictor block is a block of K pixels that has already been coded or even coded and then decoded, or not. Such a predictor block is previously stored in the buffer memory TAMP_CO of the coder CO as represented in FIG. 2.

At the end of prediction step C3, an optimum predictor block $BP_{opt}$ is obtained following entry of said predetermined prediction modes into competition, for example by minimization of a rate-distortion criterion well known to a person skilled in the art. The block $BP_{opt}$ is considered to be an approximation of the current block $B_u$. The pieces of information relating to this prediction are intended to be written to a data signal or stream to be transmitted to a decoder. Such pieces of information particularly comprise the type of prediction (inter or intra) and, if need be, the selected prediction mode, the type of partitioning of the current block if the latter has been subdivided, the reference image index and the displacement vector used in the case where an inter-prediction mode has been selected. These pieces of information are compressed by the coder CO.

During a step C4 represented in FIG. 1, the data relating to the current block $B_u$ are compared with the data of the predictor block $BP_{opt}$. More precisely, during this step, the difference between the current block $B_u$ and the predictor block obtained $BP_{opt}$ is conventionally calculated.

A set of residual data, called residue block $Br_u$, is then obtained at the end of step C4. The residue block $Br_u$ contains K residual pixels $x_1, x_2, \ldots, x_g, \ldots x_K$, where $1 \le g \le K$.

Steps C3 and C4 are implemented by a predictive coding software module PRED_CO represented in FIG. 2, which module is controlled by the microprocessor µP of the processing unit UT_CO.

During a step C5 represented in FIG. 1, the residue block $Br_u$ is correlated by pixel-by-pixel multiplication/addition to each block forming part of a predefined group $G_i$ of blocks containing a given number $M_i$ of blocks $BT_1, BT_2, \ldots BT_v, \ldots, BT_{Mi}$ having K pixels each, said blocks each representing a predetermined texture, where $i \ge 1$, $1 \le M_i < K$ and $1 \le v \le M_i$.

A block $BT_v$ having a predetermined texture and considered in the group $G_i$ contains K pixels $t_{v,1}, t_{v,2}, \ldots, t_{v,g}, \ldots, t_{v,K}$. The predefined group $G_i$ of blocks $BT_1$, $BT_2, \ldots BT_v, \ldots, BT_{Mi}$ is previously stored in the memory MEM_CO of the coder CO of FIG. 2.

More precisely, in accordance with step C5, $M_i$ data $X_{u,1}, X_{u,2}, \ldots, X_{u,Mi}$ are calculated, which are scalar values obtained using the following relationship:

$$X_{u,v} = \sum_{g=1}^{K} t_{v,g} x_g$$

Such a step C5 is implemented by a calculation software module CAL1_CO represented in FIG. 2, which module is controlled by the microprocessor µP of the processing unit UT_CO.

Referring to FIG. 3A, an example of a group $G_i$ of $M_i$ blocks having a predetermined texture is represented. In this example, K=16 and $M_i$=4. The group $G_i$ therefore contains four blocks having a predetermined texture $BT_1, BT_2, BT_3, BT_4$ that each contain 16 pixels.

During a step C6 represented in FIG. 1, conventional quantization of the $M_i$ data $X_{u,1}, X_{u,2}, \ldots, X_{u,Mi}$ is performed. A block $Bq_u$ characterized by $M_i$ quantized data $Xq_{u,1}, Xq_{u,2}, \ldots, Xq_{u,Mi}$ is then obtained. Such a step is performed by means of a quantization software module MQ_CO as represented in FIG. 2, which module is controlled by the microprocessor µP of the processing unit UT_CO.

During a step C7 represented in FIG. 1, the pieces of amplitude and sign information associated with each of the $M_i$ quantized data $Xq_{u,1}, Xq_{u,2}, \ldots, Xq_{u,Mi}$ of the block $Bq_u$ of quantized data are coded. In the preferred embodiment, the coding performed is entropy coding of arithmetic or Huffman type. Step C7 then involves:

reading the symbol(s) from the predetermined set of symbols that are associated with said block $Bq_u$ of quantized data, associating pieces of digital information, such as bits, with the read symbol(s).

In another embodiment, the $M_i$ quantized data are coded in a similar manner to that used by HEVC. To this end, the $M_i$ quantized data are subjected to entropy coding (for example of arithmetic coding or Huffman coding type) as follows:

a piece of information is subjected to entropy coding in order to indicate the location of the last nonzero quantized datum, for each quantized datum situated before the last nonzero quantized datum, a piece of information is subjected to entropy coding in order to indicate whether or not the quantized datum is zero, for each previously indicated nonzero quantized datum, a piece of information is subjected to entropy coding in order to indicate whether or not the quantized datum is equal to one, for each nonzero and non-one quantized datum situated before the last nonzero quantized datum, a piece of amplitude information is subjected to entropy coding, for each nonzero quantized datum, the sign assigned thereto is coded by a '0' (for the + sign) or a '1' (for the – sign).

Such an entropy coding step is implemented by an entropy coding software module MCE represented in FIG. 2, which module is controlled by the microprocessor µP of the processing unit UT_CO. By way of example, the entropy coding module MCE is of CABAC ("Context Adaptive Binary Arithmetic Coder") type. It may also be a Huffman coder known as such.

At the end of the aforementioned coding step C7, a data signal or stream F that contains the set of the coded data of the block $Bq_u$ of quantized data is then delivered. Such a stream is then transmitted by a communication network (not represented) to a remote terminal. The latter has the decoder DO represented in FIG. 5. As is known per se, the stream F further comprises some pieces of information coded by the coder CO, such as the type of prediction (inter or intra) and, if need be, the selected prediction mode, the index of the predictor block $BP_{opt}$ obtained at a conclusion of step C3, the type of partitioning of the current block $B_u$ if the latter has been partitioned, the reference image index and the displacement vector that are used in the inter-prediction mode.

During a step C8 represented in FIG. 1, the block $Bq_u$ is dequantized according to a conventional dequantization operation, which is the reverse operation of the quantization performed in step C6. A block $BDq_u$ of $M_i$ dequantized data $XDq_{u,1}, XDq_{u,2}, \ldots, XDq_{u,Mi}$ is then obtained.

Such a dequantization step is performed by an inverse quantization software module $MQ^{-1}\_CO$, as represented in FIG. 2, which module is controlled by the microprocessor µP of the processing unit UT_CO.

During a step C9 represented in FIG. 1, each of the $M_i$ dequantized data $XDq_{u,1}, XDq_{u,2}, \ldots, XDq_{u,Mi}$ is multiplied by the number $M_i$ of blocks of K pixels $BT_1, BT_2, \ldots BT_v, \ldots, BT_{Mi}$ having a predetermined texture that are stored in the memory MEM_CO of the coder CO of FIG. 2.

At the end of step C9, $M_i$ decoded residue blocks $BDr_{u,1}, BDr_{u,2}, \ldots, BDr_{u,Mi}$ are obtained.

During a step C10 represented in FIG. 1, a decoded residue block $BDr_u$ is determined on the basis of the $M_i$ decoded residue blocks $BDr_{u,1}, BDr_{u,2}, \ldots, BDr_{u,Mi}$ obtained.

In the particular case in which $M_i=1$, that is to say that a single decoded residue block $BDr_{u,v}$ has been calculated, the decoded residue block $BDr_u$ is equal to the decoded residue block $BDr_{u,v}$.

When $M_i \neq 1$, more precisely, the decoded residue block $BDr_u$ is obtained by adding the $M_i$ decoded residue blocks $BDr_{u,1}, BDr_{u,2}, \ldots, BDr_{u,Mi}$ using the following relationship:

$$BDr_u = \sum_{v=1}^{M_i} BDr_{u,v}$$

The set of the aforementioned steps C9 to C10 are carried out by a calculation software module CAL2_CO as represented in FIG. 2, which module is controlled by the microprocessor µP of the processing unit UT_CO.

During a step C11 represented in FIG. 1, the current decoded block $BD_u$ is constructed by adding the decoded residue block $BDr_u$ to the predictor block $BP_{opt}$ obtained in the aforementioned step C3. It should be noted that this block $BD_u$ is the same as the decoded block obtained at the end of the method for decoding the image $IC_j$ that will be described later on in the description. The decoded block $BD_u$ is then stored in the buffer memory TAMP_CO of FIG. 2, in order to be used by the coder CO as a predictor block for a subsequent block to be coded.

Such a step is implemented by an inverse predictive coding software module $PRED^{-1}\_CO$ represented in FIG. 2, which module is controlled by the microprocessor µP of the processing unit UT_CO.

Coding steps C2 to C11 that have just been described above are then implemented for each of the blocks $B_1, B_2, \ldots, B_u, \ldots, B_S$ to be coded from the current image $IC_j$ under consideration.

The coding method that has just been described above requires fewer calculation operations than in the aforementioned prior art, given that in calculation step C5, the residue block $Br_u$ is multiplied pixel by pixel by a predefined number $M_i$ of blocks having K pixels $BT_1, BT_2, \ldots BT_v, \ldots, BT_{Mi}$ that is smaller than the number K of pixels of the current block $B_u$.

Figure 5:
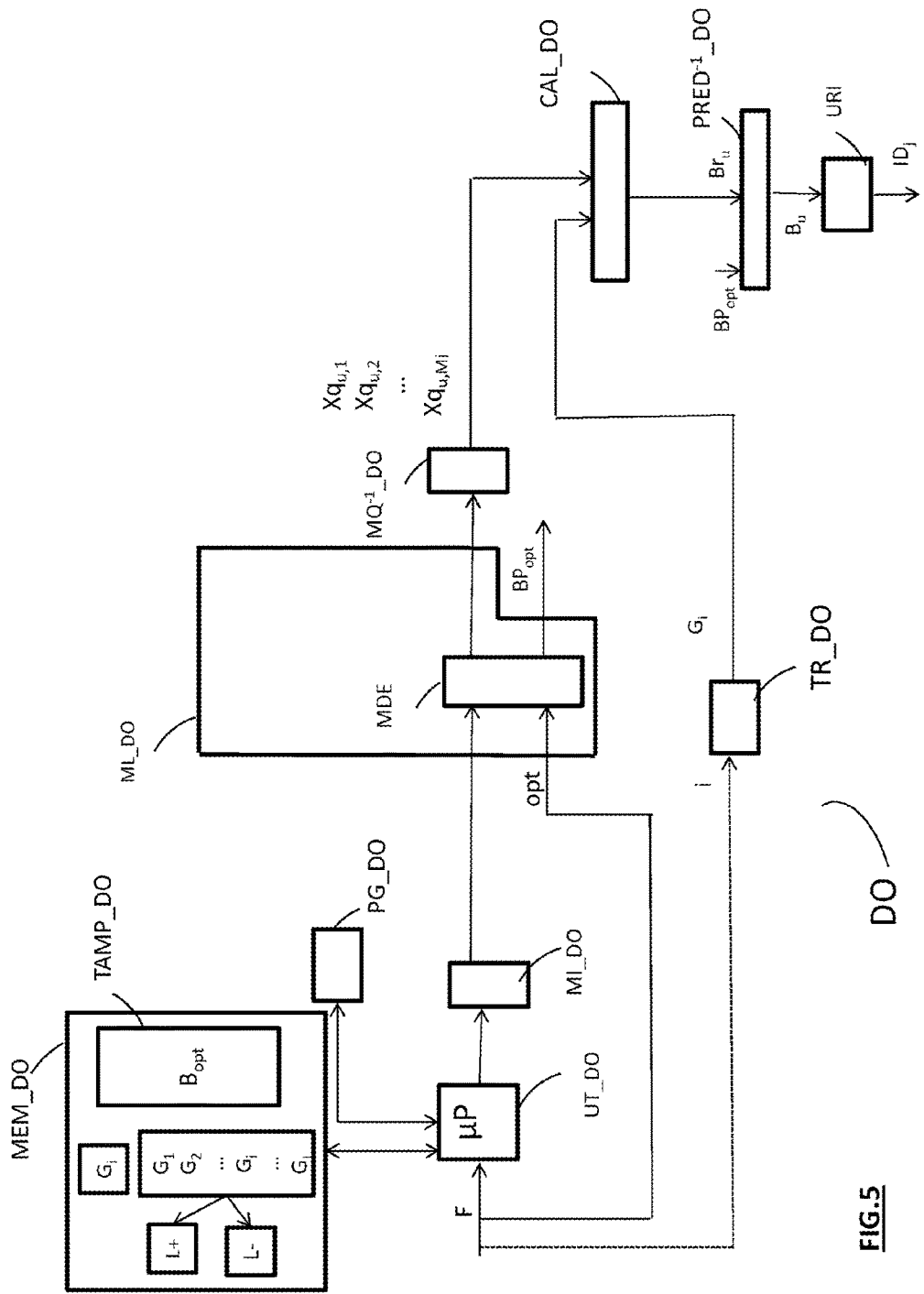
FIG. 5 represents an embodiment of a decoding device according to the invention.

The result of this is that the data coded following entropy coding step C7 are fewer than in the prior art, which makes it possible to improve the transmission rate gain for such data to the decoder DO of FIG. 5.

The four exemplary embodiments mentioned below indicate the number of operations in order to obtain the $M_i$ data $X_{u,1}, X_{u,2}, \ldots, X_{u,Mi}$ following the implementation of calculation step C5:

- if $M_i=1$ and K=256, only 256 multiplications need to be performed in comparison with the 2592 additions and 1056 multiplications performed when a fast transform of DCT or DST type is applied conventionally to a current block of 256 pixels,
- if $M_i=1$ and K=16, only 16 multiplications need to be performed in comparison with the 72 additions and 40 multiplications performed when a fast transform of DCT or DST type is applied conventionally to a current block of 16 pixels,
- if $M_i=2$ and K=256, only 256 additions and 512 multiplications need to be performed in comparison with the 2592 additions and 1056 multiplications performed when a fast transform of DCT or DST type is applied conventionally to a current block of 256 pixels,
- if $M_i=2$ and K=16, only 16 additions and 32 multiplications need to be performed in comparison with the 72 additions and 40 multiplications performed when a fast transform of DCT or DST type is applied conventionally to a current block of 16 pixels.

In the case of HEVC coding, it is further possible to reduce the bit rate in the course of entropy coding step C7. As has already been explained earlier on in the introduction to the description, in accordance with HEVC coding, the quantized data are transmitted by indicating the position of the last nonzero quantized datum. Such a position is represented by two indicators called posX and posY that indicate, in the block $Bq_u$ of $M_i$ quantized data $Xq_{u,1}, Xq_{u,2}, \ldots, Xq_{u,Mi}$, the coordinates of the last nonzero quantized datum.

By virtue of the invention, the values of posX and/or posY can be prevented from being transmitted in the stream F.

According to a first example, in an embodiment in which $M_i=1$, there is just a single quantized datum to be transmitted. The position of this single quantized datum is therefore known since it is necessarily the first quantized datum of the block $Bq_u$. Thus, neither of the values of posX and/or posY is signaled in the stream F.

According to a second example, in an embodiment in which $M_i=2$, there are just two quantized data $Xq_{u,1}, Xq_{u,2}$ to be transmitted. To this end, only the value of posX or of posY needs to be signaled, a single signaling being sufficient to cover the alternatives $Xq_{u,1}$ or $Xq_{u,2}$. Such a value of posX or posY may even be coded on a single bit, for example a bit set to 0 to indicate that the last nonzero quantized datum is $Xq_{u,1}$ and a bit set to 1 to indicate that the last nonzero quantized datum is $Xq_{u,2}$.

It is worth noting, however, that the distortion of the current image $IC_j$ may be increased taking account of the reduction in coded data that is obtained by virtue of the aforementioned coding method.

To limit this effect, according to another exemplary embodiment, the memory MEM_CO of the coder CO of FIG. 2 no longer stores a single predefined group $G_i$ of Mi texture blocks $BT_1, BT_2, \ldots BT_v, \ldots, BT_{Mi}$ but stores L groups $G_1, G_2, \ldots, G_i, \ldots, G_L$ of pixel blocks, among which the aforementioned group $G_i$ features, the L groups respectively containing a number $M_1, M_2, \ldots, M_i, \ldots, M_L$ of blocks having K pixels and each representing a predetermined texture, where $1 \leq i \leq L$.

Referring to FIG. 3B, L groups $G_1, G_2, \ldots, G_i, \ldots, G_L$ of blocks having a predetermined texture are represented. In this example, K=16 and L=3.

The first group $G_1$ contains a number $M_1$ of blocks having a predetermined texture that is, by way of example, equal to the number of pixels of the current block, or K=16. Therefore, $M_1$=16. Thus, as illustrated in FIG. 3B, the group $G_1$ contains sixteen blocks having a predetermined texture $BT_{1,1}, BT_{1,2}, \ldots, BT_{1,16}$ that each contain 16 pixels.

The second group $G_2$ contains a number $M_2$ of blocks having a predetermined texture, such that $M_2$=1. Thus, as illustrated in FIG. 3B, the group $G_2$ contains a single block having a predetermined texture $BT_{2,1}$ of 16 pixels.

The third group $G_3$ contains a number $M_3$ of blocks having a predetermined texture, such that $M_3$=2. Thus, as illustrated in FIG. 3B, the group $G_3$ contains two blocks having a predetermined texture $BT_{3,1}$ and $BT_{3,2}$ each containing 16 pixels.

Figure 4:
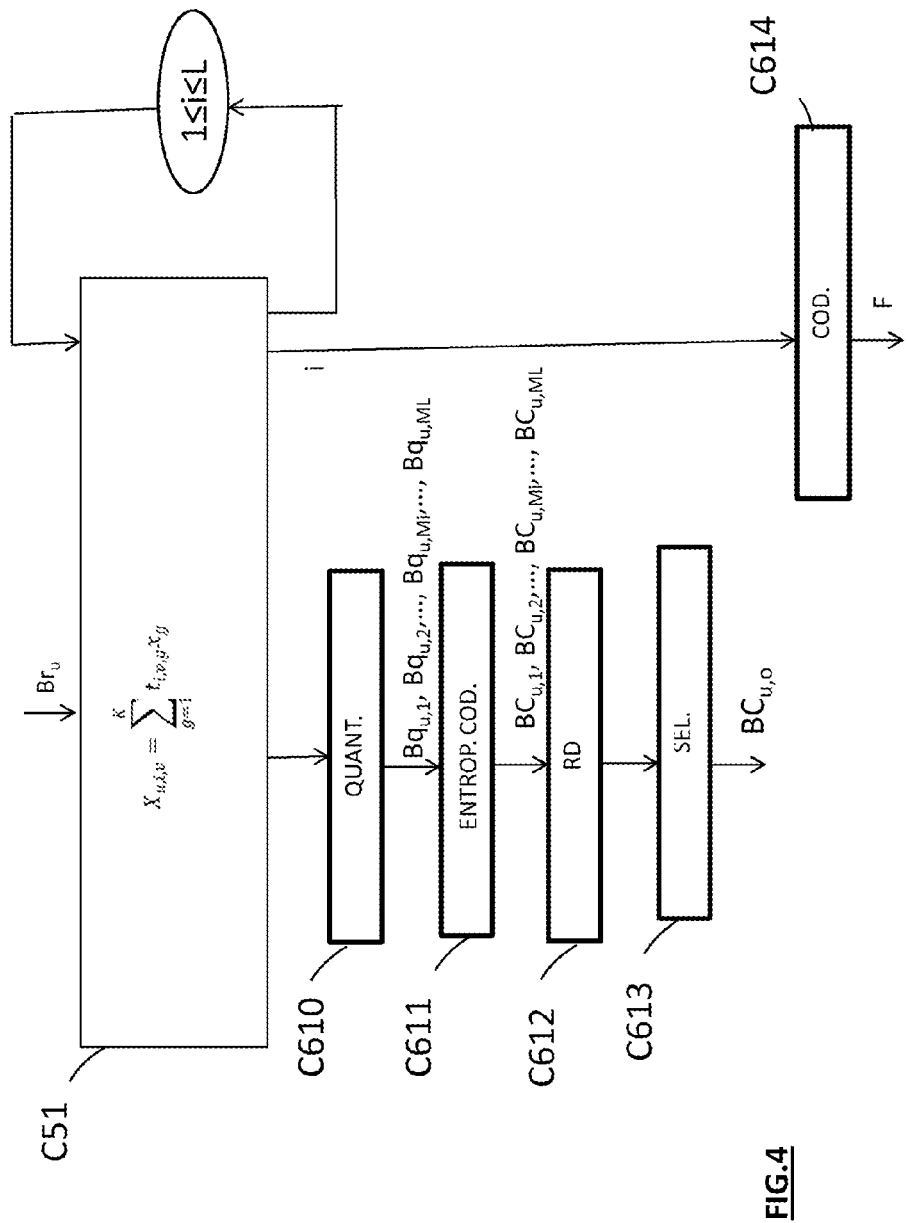
FIG. 4 represents some of the steps of the coding method according to another embodiment of the invention.

In accordance with the embodiment of FIG. 3B, the coding method according to the invention is then modified from the aforementioned step C5, as represented in FIG. 4.

During step C51 represented in FIG. 4, the calculation software module CAL1_CO of FIG. 2 determines L sets each having $M_1, M_2, \ldots, M_i, \ldots M_L$ data, by calculating the pixel-by-pixel product of the residue block $Br_u$ determined at the end of step C4 by each of the $M_1, M_2, \ldots, M_i, \ldots M_L$ blocks having K pixels and representing a predetermined texture.

More precisely, during step C51, for a considered group $G_i$ of blocks having a predetermined texture $BT_{i,1}, BT_{i,2} \ldots BT_{i,v}, \ldots, BT_{i,Mi}$, for which a block $BT_{i,v}$ having a predetermined texture and considered in the group $G_i$ contains K pixels $t_{i,v,1}, t_{i,v,2}, \ldots, t_{i,v,g}, \ldots, t_{i,v,K}$, $M_i$ data $X_{u,i,1}, X_{u,i,2}, \ldots, X_{u,i,Mi}$ are calculated, which are scalar values obtained using the following relationship:

$$X_{u,i,v} = \sum_{g=1}^{K} t_{i,v,g} x_g$$

At the end of step C51, L sets each having $M_1, M_2, \ldots, M_i, \ldots M_L$ data are obtained.

During a step C610 represented in FIG. 4, the quantization software module MQ_CO of FIG. 2 conventionally quantizes the $M_1, M_2, \ldots, M_i, \ldots, M_L$ data of each of the L sets. L blocks $Bq_{u,1}, Bq_{u,2}, \ldots, Bq_{u,L}$ are then obtained.

During a step C611 represented in FIG. 4 and similar to the aforementioned step C7, the amplitude and sign information associated with each of the $M_1, M_2, \ldots, M_i, \ldots, M_L$ quantized data obtained is coded.

At the end of step C611, L blocks of coded data $BC_{u,1}, BC_{u,2}, \ldots, BC_{u,i}, \ldots, BC_{u,L}$ are obtained.

During a step C612 represented in FIG. 4, for each of the L blocks of coded data $BC_{u,1}, BC_{u,2}, \ldots, BC_{u,i}, \ldots, BC_{u,L}$ obtained in association with each of the L groups $G_1, G_2, \ldots, G_i, \ldots, G_L$ of blocks having a predetermined texture, the calculation software module CAL1_CO of FIG. 2 calculates a predetermined coding performance criterion RD, such as the rate-distortion criterion well known to a person skilled in the art.

During a step C613 represented in FIG. 4, the block that, among the L blocks of coded data $BC_{u,1}, BC_{u,2}, \ldots, BC_{u,i}, \ldots, BC_{u,L}$, minimizes the rate-distortion criterion is selected for the remainder of the coding method. Such a block of coded data is denoted $BC_{u,o}$. In the exemplary embodiment, the selected block of coded data is associated with the group $G_i$ of blocks having a predetermined texture $BT_{i,1}, BT_{i,2}, \ldots BT_{i,v}, \ldots, BT_{i,Mi}$.

During a step C614 represented in FIG. 4, a piece of identification information for the group $G_i$ of blocks having a predetermined texture that is associated with the block of coded data $BC_{u,o}$ selected following the aforementioned step C613 is coded. By way of example, such a piece of information is the index i of the group $G_i$. The index i may be represented by a code of fixed or variable length (of Huffman or arithmetic code type).

Such a calculation step is performed by an information coding software module MCI_CO, as represented in FIG. 2, which module is controlled by the microprocessor μP of the processing unit UT_CO.

Identical steps to each of steps C8 to C11 of FIG. 1 are then implemented in order to process the block of quantized data $Bq_{u,o}$ that is associated with the block of coded data $BC_{u,o}$. For these reasons, said steps are neither described nor represented in FIG. 4.

The coding method that has just been described in connection with FIG. 4 thus makes it possible to limit the increase in distortion owing to an increase in the coding options for a current block using various groups available to the coding, each containing a plurality of blocks having a predetermined texture.

According to an embodiment of the coding method of FIG. 4:

- at least one group from among the L groups $G_1, G_2, \ldots, G_i, \ldots, G_L$ of pixel blocks contains K blocks having a predetermined texture,
- at least one group from among the L−1 remaining groups of pixel blocks contains a single block having a predetermined texture.

According to a preferred embodiment:

- a group from among the L groups $G_1, G_2, \ldots, G_i, \ldots, G_L$ of pixel blocks contains K blocks having a predetermined texture,
- the remaining L−1 groups of pixel blocks each contain a single block having a predetermined texture.

In a particular case in which $M_i$=K, the operation allowing:

- either calculation, during the aforementioned step C5, of the K data $X_{u,1}, X_{u,2}, \ldots, X_{u,K}$,
- or calculation, during the aforementioned step C51, of the K data $X_{u,i,1}, X_{u,i,2}, \ldots, X_{u,i,K}$, is a transform of DST or DCT type as used in the HEVC standard, for example.

Thus, the obtainment of the K data $X_{u,1}, X_{u,2}, \ldots, X_{u,K}$ or of the K data $X_{u,i,1}, X_{u,i,2}, \ldots, X_{u,i,K}$ is advantageously implemented using a fast algorithm well known to a person skilled in the art.

Advantageously, the number L−1 is chosen as a power of 2. In this way, the index of the group associated with the block $BC_{u,o}$ of coded data that is selected following step C613 of FIG. 4 is signaled in the stream F by means of a flag, as follows:
- a flag set to 0, for example indicates that the block $BC_{u,o}$ of coded data that is selected following step C613 is the one associated with the group that contains K blocks having a predetermined texture,
- a flag set to 1, for example, indicates that the block $BC_{u,o}$ of coded data that is selected following step C613 is the one associated with one of the L−1 remaining groups of pixel blocks each containing a single block having a predetermined texture.

In the case of a flag set to 1, the index i of the group $G_i$ associated with the block $BC_{u,o}$ of coded data that is selected following step C613 and that forms part of the L−1 remaining groups of pixel blocks that each contain a single block having a predetermined texture is coded during the aforementioned step C614. Such an index may be represented by a code having a fixed or variable length (of Huffman or arithmetic code type).

In accordance with the preferred embodiment described above, it has been observed that with L=5, L=9, L=17 or L=33, the coder CO of FIG. 2 adopts good compromises with the aim of obtaining high coding performance levels, with so many compromises for storage complexity for the groups of blocks having a predetermined texture that contain 16 pixels, 64 pixels, or 256 pixels.

More precisely, the best coding performance levels are obtained:
- for a current block $B_u$ of 16 pixels, with a group containing 16 blocks having a predetermined texture and 32 other groups each containing a single block having a predetermined texture,
- for a current block $B_u$ of 64 pixels, with a group containing 16 blocks having a predetermined texture and 32 other groups each containing a single block having a predetermined texture.

According to a variant embodiment represented in FIG. 2, among the L groups $G_1, G_2, \ldots, G_i, \ldots, G_L$ of blocks having a predetermined texture:
- the groups of blocks having a predetermined texture that, after multiplication of each of their respective blocks having a predetermined texture by the current residue block $Br_u$, then quantization of the scalar values obtained, make it possible to obtain positive quantized values for the block $Bq_u$ of quantized data are stored together in a first list L+,
- while the groups of blocks having a predetermined texture that, after multiplication of each of their respective blocks having a predetermined texture by the current residue block $Br_u$, then quantization of the scalar values obtained, make it possible to obtain negative quantized values for the block $Bq_u$ of quantized data are stored in a second list L−.

Whether the coding method according to the invention is implemented according to the embodiment represented in FIG. 1 or in FIG. 4, a group of blocks having a predetermined texture or multiple groups of blocks having a predetermined texture is/are put together using an identical method.

Such a method involves generating one or more groups of blocks having a predetermined texture by learning.

To this end, prior to the coding method according to the invention, a large number of blocks of residue data is collected.

Learning is carried out in two main steps.

According to a first step, one or more different groups $GP_1, GP_2, \ldots, GP_w, \ldots, GP_L$ of blocks of residual data, where $1 \leq w \leq L$, are gathered together.

This gathering step is performed by comparing a distortion criterion obtained after coding/decoding residual data by each group of texture blocks of a set of L groups of texture blocks $G_1, G_2, \ldots, G_w, \ldots, G_L$ that each comprise $M_1, M_2, \ldots, M_w, \ldots, M_L$ texture blocks. A considered block of residual data is assigned to a considered group $GP_w$ if the lowest distortion is obtained by the coding of this considered block of residual data with the corresponding group $G_w$ of texture blocks.

A group $GP_w$ containing a given number $N_w$ of blocks $BR_{w,1}, BR_{w,2}, \ldots, BR_{w,z}, \ldots, BR_{w,Nw}$ of residual data is then considered from among the groups $GP_1, GP_2, \ldots, GP_w, \ldots, GP_L$.

According to a second step, for said considered group $GP_w$, the group of texture blocks for this group is updated. To this end:

$N_w$ current quantized residual blocks $Bq_{u,w,1}, Bq_{u,w,2}, \ldots, Bq_{u,w,z}, \ldots, Bq_{u,w,Nw}$ are constructed, the $N_w$ current quantized residual blocks $Bq_{u,w,1}, Bq_{u,w,2}, \ldots, Bq_{u,w,z}, \ldots, Bq_{u,w,Nw}$ are decoded in order to obtain $N_w$ decoded residual blocks $BDr_{u,w,1}, BDr_{u,w,2}, \ldots, BDr_{u,w,z}, \ldots, BDr_{u,w,Nw}$, respectively using conventional dequantization techniques.

The texture blocks of the group Gw are then updated in order to make them more suited to the coding of the residual data blocks. This update is performed by an identification method between the set of residual data of the considered group $GP_w$ and the quantized residual data with the group $G_w$ of texture blocks. This identification of the optimum group of texture blocks can be performed conventionally by singular value decomposition (SVD) or by analysis of main components in order to update the set of texture blocks $BT_{w,1}, BT_{w,2}, \ldots BT_{w,v}, \ldots, BT_{w,Mw}$ allowing the group of texture blocks minimizing a distortion criterion to be found.

The above process is reiterated, namely the blocks of residual data of the group $GP_w$ are again coded by the set of updated texture blocks $BT_{w,1}, BT_{w,2}, \ldots BT_{w,v}, \ldots, BT_{w,Mw}$, and then said texture blocks are updated until convergence of the distortion criterion is obtained.

The operations performed during this step are reiterated for each of the groups $GP_1$ to $GP_L$ of blocks of residual data in order to obtain $G_1$ to $G_L$ groups, respectively, of corresponding texture blocks.

The first and second steps are then reiterated until convergence of the sum of the distortions obtained for each of the groups $GP_1, GP_2, \ldots, GP_w, \ldots, GP_L$ of blocks of residual data is obtained. The aforementioned first and second steps may also include a metric taking into account the number of quantized data transmitted, particularly using an estimation of the bit rate for a given quantization.

Detailed Description of the Decoding Part

An embodiment of the decoding method according to the invention will now be described, in which the decoding method is implemented in a software or hardware manner by modifications to a decoder initially conforming to the HEVC standard. The decoding method according to the invention is represented in the form of an algorithm having steps D1 to D9 as represented in FIG. 6.

As illustrated in FIG. 5, the decoder DO according to this embodiment of the invention comprises a memory MEM_DO comprising a buffer memory TAMP_DO, a processing unit UT_DO, for example equipped with a microprocessor µP and controlled by a computer program PG_DO that implements the decoding method according to the invention. On initialization, the code instructions of the computer program PG_DO are for example loaded into a RAM memory before being executed by the processor of the processing unit UT_DO.

Figure 6:
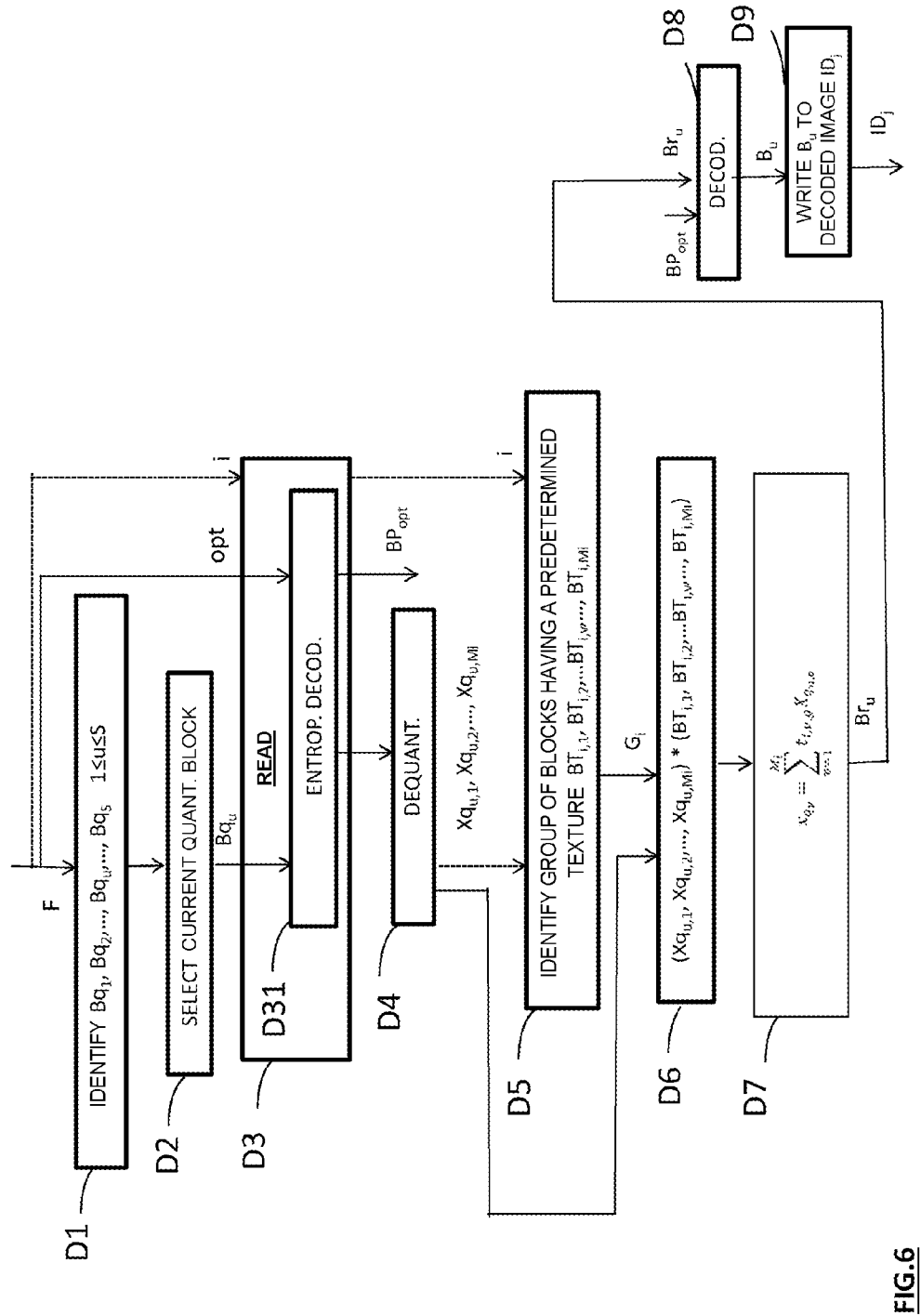
FIG. 6 represents the main steps of the decoding method according to the invention.

The decoding method represented in FIG. 6 is applied to any current image of a sequence SQ of images to be decoded.

To this end, information representing the current image $IC_j$ to be decoded is identified in the data signal or stream F received on the decoder, as delivered following the coding method of FIG. 1 or FIG. 4.

Referring to FIG. 6, during a step D1, the quantized blocks $Bq_1, Bq_2, \ldots, Bq_u, \ldots Bq_S$ ($1 \leq u \leq S$) respectively associated with the blocks $B_1, B_2, \ldots, B_u, \ldots, B_S$ previously coded by means of the aforementioned raster scan handling, in accordance with the coding method of FIG. 1, are identified in said stream F.

Such an identification step is implemented by a stream analysis identification module MI_DO, as represented in FIG. 5, said module being controlled by the microprocessor µP of the processing unit UT_DO.

The quantized blocks $Bq_1, Bq_2, \ldots, Bq_u, \ldots Bq_S$ are intended to be decoded in a predetermined scanning order, which is sequential, for example, that is to say that said blocks are intended to be decoded one after the other in accordance with the raster scan order in which they have been coded.

Types of handling other than that which has just been described above are of course possible and depend on the handling order chosen on coding, examples of which have been mentioned above.

In the preferred embodiment, the blocks to be decoded have a square shape and all have the same size. Depending on the size of the image, which is not necessarily a multiple of the size of the blocks, the last blocks on the left and the last blocks at the bottom may not be square. In an alternative embodiment, the blocks may be of rectangular size and/or not aligned with one another, for example.

Each block may moreover be itself divided into subblocks that are themselves subdivisible.

During a step D2 represented in FIG. 6, the decoder DO of FIG. 5 selects, as current block, the first quantized block $Bq_u$ that contains the $M_i$ quantized data $Xq_{u,1}, Xq_{u,2}, \ldots, Xq_{u,Mi}$ that have been coded during the aforementioned step C7.

During a step D3 represented in FIG. 6, in association with the quantized block $Bq_u$ that has been selected, the following are conventionally read:
  a piece of identification information for the predictor block $BP_{opt}$ that has been selected during prediction step C3 of the coding method represented in FIG. 1 or in FIG. 4, such a piece of information consisting of the index opt of the predictor block $BP_{opt}$, for example,
  information relating to the prediction, which information particularly comprises the type of prediction (inter or intra), the type of partitioning of the current block if the latter has been subdivided, the reference image index and the displacement vector that are used when an inter-prediction mode has been selected,
  coded quantized data of the quantized block $Bq_u$ that has been coded in step C7 of FIG. 1.

Only when the coding method of FIG. 4 has been implemented, during reading step D3, is the piece of identification information for the group $G_i$ of blocks of predetermined texture $BT_{i,1}, BT_{i,2}, \ldots BT_{i,v}, \ldots, BT_{i,Mi}$, which have each been multiplied by the residue block $Br_u$ during step C51 of the coding method of FIG. 4, also read.

Such a piece of identification information consists of the index i of the group $G_i$, for example.

This reading step D3 is of no use when the coding method of FIG. 1 has been implemented because the group $G_i$ is unique and is therefore known to the decoder DO of FIG. 5.

The reading step D3 is performed by a reading software module ML_DO, as represented in FIG. 5, which module is controlled by the microprocessor µP of the processing unit UT_DO.

More precisely, the reading step D3 comprises a substep D31 of decoding the amplitude and sign information associated with each of the $M_i$ coded quantized data of the block $Bq_u$ of quantized data. In the preferred embodiment, the data decoding is entropy decoding of arithmetic or Huffman type. The substep D31 then involves:
  reading the symbol(s) from the predetermined set of symbols that are associated with said block $Bq_u$ of quantized data,
  associating digital information, such as bits, with the read symbol(s).

At the end of the aforementioned substep D31, a number $M_i$ of pieces of digital information each associated with the $M_i$ quantized data $Xq_{u,1}, Xq_{u,2}, \ldots, Xq_{u,Mi}$ that have been coded during the aforementioned step C7 is obtained.

As is known per se, during the aforementioned substep D31, the index opt of the optimum predictor block $BP_{opt}$ that has been used to predict the current block in step C3 of FIG. 1 is also decoded. At the end of this operation, the corresponding predictor block $BP_{opt}$, which is stored in the buffer memory TAMP_DO of the decoder DO of FIG. 5, is therefore identified in this manner. By way of example, such a predictor block is a pixel block that has already been decoded, or not, and that has been obtained in accordance with the prediction mode selected on coding. The block $BP_{opt}$ is an approximation of the current block $B_u$ to be decoded.

Such an entropy decoding substep D31 is implemented by an entropy decoding software module MDE represented in FIG. 5, which module is controlled by the microprocessor µP of the processing unit UT_DO. The entropy decoding module MDE is of CABAC type, for example. It may also be a Huffman decoder known as such.

During a step D4 represented in FIG. 6, the $M_i$ pieces of digital information obtained following substep D31 are dequantized in accordance with a conventional dequantization operation. A decoded block $Bq_u$ of $M_i$ quantized data $Xq_{u,1}, Xq_{u,2}, \ldots, Xq_{u,Mi}$ is then obtained.

Such a dequantization step is performed by an inverse quantization software module $MQ^{-1}\_DO$, as represented in FIG. 5, which module is controlled by the microprocessor µP of the processing unit UT_DO.

During a step D5 represented in FIG. 6, either the unique group $G_i$ of $M_i$ blocks $BT_1, BT_2, \ldots BT_v, \ldots, BT_{Mi}$ having a predetermined texture, if it is the coding method of FIG. 1 that has been implemented, or, among the L groups $G_1, G_2, \ldots, G_i, \ldots, G_L$ of blocks having a predetermined texture that are stored in memory, the group $G_i$ of blocks $BT_{i,1}, BT_{i,2}, \ldots BT_{i,v}, \ldots, BT_{i,Mi}$ having a predetermined texture, if it is the coding method of FIG. 4 that has been implemented, is identified in the memory MEM_DO of the decoder DO of FIG. 5.

The abovementioned identification step D5 is performed by a processing software module TR_DO, as represented in FIG. 5, which module is controlled by the microprocessor µP of the processing unit UT_DO.

In the example represented in FIG. 6, the identification step D5 is implemented following steps D3 and D4. However, identification step D5 can also be implemented before steps D3 and D4 or in parallel with said steps.

When it is the coding method of FIG. 1 that has been implemented, the processing module TR_DO identifies the only group $G_i$ of $M_i$ blocks $BT_1, BT_2, \ldots BT_v, \ldots, BT_{Mi}$ having a predetermined texture directly in the memory MEM_DO of the decoder DO of FIG. 5.

When it is the coding method of FIG. 4 that has been implemented, on the basis of the index i that has been read during the aforementioned step D3, the processing module TR_DO identifies the corresponding group $G_i$ of blocks $BT_{i,1}, BT_{i,2}, \ldots BT_{i,v}, \ldots, BT_{i,Mi}$ having a predetermined texture in the memory MEM_DO of the decoder DO of FIG. 5, from among the L groups $G_1, G_2, \ldots, G_i, \ldots, G_L$ of blocks having a predetermined texture.

In a manner similar to decoding method according to the invention, a block $BT_v$ having a predetermined texture and considered in the group $G_i$ contains K pixels $t_{v,1}, t_{v,2}, \ldots, t_{v,g}, \ldots, t_{v,K}$.

During a step D6 represented in FIG. 6, the product of each of the $M_i$ blocks of K pixels of the group $G_i$ identified in step D5 is calculated by, respectively, each of the $M_i$ quantized data $Xq_{u,1}, Xq_{u,2}, \ldots, Xq_{u,Mi}$ as obtained at the end of the aforementioned dequantization step D4.

At the end of step D6, $M_i$ decoded blocks $Br_{u,1}, Br_{u,2}, \ldots, Br_{u,Mi}$ of residual data are obtained.

During a step D7 represented in FIG. 6, a decoded residual block $Br_u$ is determined on the basis of the $M_i$ decoded residual blocks $Br_{u,1}, Br_{u,2}, \ldots, Br_{u,Mi}$ obtained.

In the particular case in which $M_i=1$ and K=16, that is to say that a single decoded residual block $Br_{u,v}$ has been calculated, the decoded residual block $Br_u$ is equal to the decoded residual block $Br_{u,v}$.

Such a provision is particularly advantageous on decoding because the number of data to be decoded is far smaller than in the prior art for which $M_i$=K. The result of this is less complex and faster decoding.

When $M_i \neq 1$, the decoded residual block $Br_u$ is obtained by adding the $M_i$ decoded residual blocks $Br_{u,1}, Br_{u,2}, \ldots, Br_{u,Mi}$.

More generally, step D7 is expressed according to the following relationship:

$$x_{q_v} = \sum_{v=1}^{M_i} t_{i,v,g} X_{q_{u,v}}$$

where $1 \leq v \leq K$.

At the end of step D7, a decoded residual block $Br_u$ having K pixels $xq_1, xq_2, \ldots, xq_K$ is obtained.

The set of the aforementioned steps D6 to D7 is carried out by a calculation software module CAL_DO as represented in FIG. 5, which module is controlled by the microprocessor µP of the processing unit UT_DO.

During a step D8 represented in FIG. 6, the decoded block $B_u$ is constructed by adding the decoded residue block $Br_u$ to the predictor block $BP_{opt}$ identified in the aforementioned step D3.

Such a step is implemented by an inverse predictive decoding software module $PRED^{-1}\_DO$ represented in FIG. 5, which module is controlled by the microprocessor µP of the processing unit UT_DO.

At the end of step D8, the decoded block $B_u$ obtained is stored in the buffer memory TAMP_DO of FIG. 5 so as to be used by the decoder DO possibly as a predictor block for a subsequent block to be decoded.

During a step D9 represented in FIG. 6, said decoded block $B_u$ is written into a decoded image $ID_j$.

Such a step is implemented by an image reconstruction software module URI as represented in FIG. 5, said module being controlled by the microprocessor µP of the processing module UT_DO.

Decoding steps D2 to D9 that have just been described above are then implemented for each of the blocks $B_1, B_2, \ldots, B_u, \ldots, B_S$ to be decoded for the current image $IC_j$ under consideration.

In a variant embodiment of the decoding method as represented in FIG. 7, reading step D3 of FIG. 6 further comprises a step D310 involving reading, from the data signal F, the value of the polarity of the sign of at least one read data from among the $M_i$ data $Xq_{u,1}, Xq_{u,2}, \ldots, Xq_{u,Mi}$ of the quantized block $Bq_u$.

Such a step is implemented by the reading module ML_DO of FIG. 5.

Still referring to FIG. 7, identification step D5 of FIG. 6 further comprises a step D510 that involves taking the value of the positive or negative polarity of the sign of at least one of the $M_i$ data $Xq_{u,1}, Xq_{u,2}, \ldots, Xq_{u,Mi}$ of the quantized block $Bq_u$ and taking the piece of pixel block group identification information read from the signal F as a basis for identifying the corresponding block having a predetermined texture:

either in the first aforementioned list L+ that is stored in the memory MEM_DO of the decoder DO of FIG. 5, which list L+ contains the groups of blocks having a predetermined texture allowing positive quantized values from the block $Bq_u$ of quantized data to be obtained, or in the second aforementioned list L− that is stored in the memory MEM_DO of the decoder DO of FIG. 5, which list L− contains the groups of blocks having a predetermined texture allowing negative quantized values from the block $Bq_u$ of quantized data to be obtained.

It goes without saying that the embodiments that have been described above have been provided purely by way of indication and without applying any limitation, and that numerous modifications can easily be made by a person skilled in the art without, however, departing from the scope of the invention.

The invention claimed is:

1. A coding method comprising:
    coding by a coding device at least one image cut into blocks, comprising the coding device performing the following acts for a current block having K pixels to be coded, where K≥1:
    predicting the current block using at least one predictor block having K pixels,
    determining a residue block having K pixels and representing the difference between the predictor block and the current block,
    taking a predefined group of blocks of pixels, independent from said at least one image and containing a number $M_i$ of blocks having K pixels and each representing a predetermined texture, where i≥1 and $1 \leq M_i < K$, as a basis for determining a set of data comprising a number $M_i$ of data that is strictly inferior to the number K of pixels of the residue block, by calculating a pixel-bypixel product of the residue block determined by each of the $M_i$ blocks of K pixels representing a predetermined texture, coding the $M_i$ data of the determined set; and transmitting the coded $M_i$ data in a data stream over a communication network.

2. The coding method as claimed in claim 1, in which the group of pixel blocks containing a number $M_i$ of blocks having K pixels and each representing a predetermined texture belongs to L groups of pixel blocks respectively containing a number $M_1, M_2, \ldots, M_i, \ldots, M_L$ of blocks having K pixels and each representing a predetermined texture, where $1 \leq i \leq L$, said coding method comprising, prior to the act of coding the $M_i$ data of the determined set, acts comprising:

taking the L groups of pixel blocks respectively containing a number $M_1, M_2, \ldots, M_i, \ldots, M_L$ of blocks having K pixels and each representing a predetermined texture as a basis for respectively determining L sets of $M_1, M_2, \ldots, M_i, \ldots, M_L$ data by calculating the pixel-by-pixel product of the residue block determined by each of the $M_1, M_2, \ldots, M_i, \ldots, M_L$ blocks of K pixels representing a predetermined texture, selecting said set of $M_i$ data from among the L sets of $M_1, M_2, \ldots, M_i, \ldots, M_L$ data, according to a predetermined coding performance criterion.

3. The coding method as claimed in claim 1, in which the set of $M_i$ data, determined or even selected according to a predetermined coding performance criterion, contains a single datum.

4. The coding method as claimed in claim 2, in which the predetermined coding performance criterion is the minimization of the rate-distortion cost of the current block to be coded.

5. The coding method as claimed in claim 1, further comprising an act of preparation of a data signal containing:

a piece of identification information for the predictor block, the coded data from the set of $M_i$ data that has been obtained by calculating the pixel-by-pixel product of the residue block determined by each of the $M_i$ blocks of K pixels representing a predetermined texture, a piece of identification information for the group containing the blocks of K pixels from which the selected set of $M_i$ data has been determined.

6. A coding device comprising:

a non-transitory computer-readable medium comprising instructions stored thereon; and a processor configured by the instructions to perform acts comprising:

coding at least one image cut into blocks, comprising, for a current block having K pixels to be coded, where $K \geq 1$, prediction means for predicting the current block using at least one predictor block having K pixels and for determining a residue block having K pixels and representing the difference between the predictor block and the current block, wherein the coding comprises:

taking a predefined group of blocks of pixels, independent from said at least one image and containing a number $M_i$ of blocks having K pixels and each representing a predetermined texture, where $i \geq 1$ and $1 \leq M_i < K$, as a basis for determining a set of data comprising a number $M_i$ of data that is strictly inferior to the number K of pixels of the residue block, by calculating a pixel-by-pixel product of the residue block determined by each of the $M_i$ blocks of K pixels representing a predetermined texture, and coding the $M_i$ data from the determined set; and transmitting the coded $M_i$ data in a data stream over a communication network.

7. A non-transitory computer-readable medium comprising a computer program stored thereon with program code instructions for executing a coding method when said program is executed on a processor of a coding device, wherein the instructions configure the coding device to perform acts comprising:

coding at least one image cut into blocks, comprising, for a current block having K pixels to be coded, where $K \geq 1$, prediction means for predicting the current block using at least one predictor block having K pixels and for determining a residue block having K pixels and representing the difference between the predictor block and the current block, wherein the coding comprises:

taking a predefined group of blocks of pixels, independent from said at least one image and containing a number $M_i$ of blocks having K pixels and each representing a predetermined texture, where $i \geq 1$ and $1 \leq M_i < K$, as a basis for determining a set of data comprising a number $M_i$ of data that is strictly inferior to the number K of pixels of the residue block, by calculating a pixel-by-pixel product of the residue block determined by each of the $M_i$ blocks of K pixels representing a predetermined texture, and coding the $M_i$ data from the determined set; and transmitting the coded $M_i$ data in a data stream over a communication network.

8. A decoding method comprising:

receiving a data signal from a communication network by a decoding device, the data signal representing at least one image cut into blocks; and decoding the data signal by the decoding device, comprising the decoding device performing the following acts for a current block having K pixels to be reconstructed, where $K \geq 1$:

determining at least one predictor block for the current block to be reconstructed, said predictor block containing K pixels, reading, from said data signal, a set of data comprising a number $M_i$ of data that is strictly inferior to the number K of pixels of a current residue block to be decoded, where $1 \leq M_i < K$ and $i \geq 1$, identifying a predefined group of blocks of pixels, independent from said at least one image and containing a given number $M_i$ of blocks having K pixels and each representing a predetermined texture, determining $M_i$ blocks having K pixels by calculating a product of each of the $M_i$ blocks of K pixels of the group identified by, respectively, each of the $M_i$ data from said read set of $M_i$ data, calculating a sum of the $M_i$ determined blocks of K pixels, determining the decoded current residue block having K pixels from the calculated sum, reconstructing the current block from the calculated decoded current residue block and the determined predictor block.

9. The decoding method as claimed in claim 8, in which the read set of $M_i$ data contains a single datum.

10. The decoding method as claimed in claim 8, in which the group of pixel blocks containing a given number $M_i$ of blocks having K pixels and each representing a predetermined texture belongs to L groups of pixel blocks respectively containing a number $M_1, M_2, \ldots, M_i, \ldots, M_L$ of blocks having K pixels and each representing a predetermined texture, where $1 \leq i \leq L$.

11. The decoding method as claimed in claim 10, in which:
    a group from among the L groups of pixel blocks contains K blocks having a predetermined texture,
    the L−1 remaining groups of pixel blocks each contain a unique block having a predetermined texture.

12. The decoding method as claimed in claim 10, further comprising:
    reading from the data signal a value of a polarity of a sign of at least one datum from said read set of $M_i$ data,
    taking the read value of the polarity of the sign and taking a piece of pixel block group identification information read from the signal as a basis for identifying the block of K pixels representing a predetermined texture either in a first set that contains a portion of the L groups of blocks of K pixels each representing a predetermined texture or in a second set that contains the other portion of the L groups of blocks of K pixels each representing a predetermined texture.

13. A decoding device comprising:
    a non-transitory computer-readable medium comprising instructions stored thereon; and
    a processor configured by the instructions to perform acts comprising:
    receiving a data signal from a communication network by the decoding device, the data signal representing at least one image cut into blocks; and
    decoding the data signal, comprising:
    determining, for a current block of K pixels to be reconstructed, where K≥1, at least one predictor block for the current block to be reconstructed, said predictor block containing K pixels,
    reading, from said data signal, a set of data comprising a number $M_i$ of data that is strictly inferior to the number K of pixels of a current residue block to be decoded, where 1≤$M_i$<K and i≥1,
    identifying a predefined group of blocks of pixels, independent from said at least one image and containing a given number $M_i$ of blocks having K pixels and each representing a predetermined texture,
    determining $M_i$ blocks having K pixels by calculating a product of each of the $M_i$ blocks of K pixels for the group identified by, respectively, each of the $M_i$ data from said read set of $M_i$ data,
    calculating a sum of the $M_i$ determined blocks of K pixels,
    determining the decoded current residue block having K pixels from the calculated sum, reconstructing the current block from the determined decoded current residue block and the determined predictor block.

14. A non-transitory computer-readable medium comprising a computer program stored thereon with instructions for implementing a decoding method when said instructions are executed on a processor of a decoding device, wherein the instructions configure the decoding device to perform acts comprising:
    receiving a data signal from a communication network by the decoding device, the data signal representing at least one image cut into blocks; and
    decoding the data signal, comprising the decoding device performing the following acts for a current block having K pixels to be reconstructed, where K≥1:
    determining at least one predictor block for the current block to be reconstructed, said predictor block containing K pixels,
    reading, from said data signal, a set of data comprising a number $M_i$ of data that is strictly inferior to the number K of pixels of a current residue block to be decoded, where 1≤$M_i$<K and i≥1,
    identifying a predefined group of pixel blocks, independent from said at least one image and containing a given number $M_i$ of blocks having K pixels and each representing a predetermined texture,
    determining $M_i$ blocks having K pixels by calculating a product of each of the $M_i$ blocks of K pixels of the group identified by, respectively, each of the $M_i$ data from said read set of $M_i$ data,
    calculating a sum of the $M_i$ determined blocks of K pixels,
    determining the decoded current residue block having K pixels from the calculated sum,
    reconstructing the current block from the calculated decoded current residue block and the determined predictor block.

* * * * *